United States Patent [19]
Bailleu

[11] 3,765,242
[45] Oct. 16, 1973

[54] REUSABLE BOLT TYPE MOUNTED THERMOCOUPLE

[76] Inventor: John R. Bailleu, c/o Barber-Colman Co., Rockford, Ill. 61101

[22] Filed: July 24, 1972

[21] Appl. No.: 274,255

[52] U.S. Cl. .................. 73/359, 73/420, 85/1 L
[51] Int. Cl. ............................... G01k 7/02
[58] Field of Search .......... 73/359–361, 349, 420; 85/1 L, 1 S

[56] References Cited
UNITED STATES PATENTS

| | | | |
|---|---|---|---|
| 2,002,532 | 5/1935 | Flatley | 73/359 |
| 3,589,192 | 6/1971 | Sabovik | 73/359 |

*Primary Examiner*—Donald O. Woodiel
*Attorney*—A. Richard Koch

[57] ABSTRACT

A reusable bolt type thermocouple mounting is slotted lengthwise to permit replacement of the thermocouple in the mounting and so permit reuse of the mounting. The thermocouple is separably retained in the reusable mounting by a spring.

20 Claims, 5 Drawing Figures

PATENTED OCT 16 1973            3,765,242
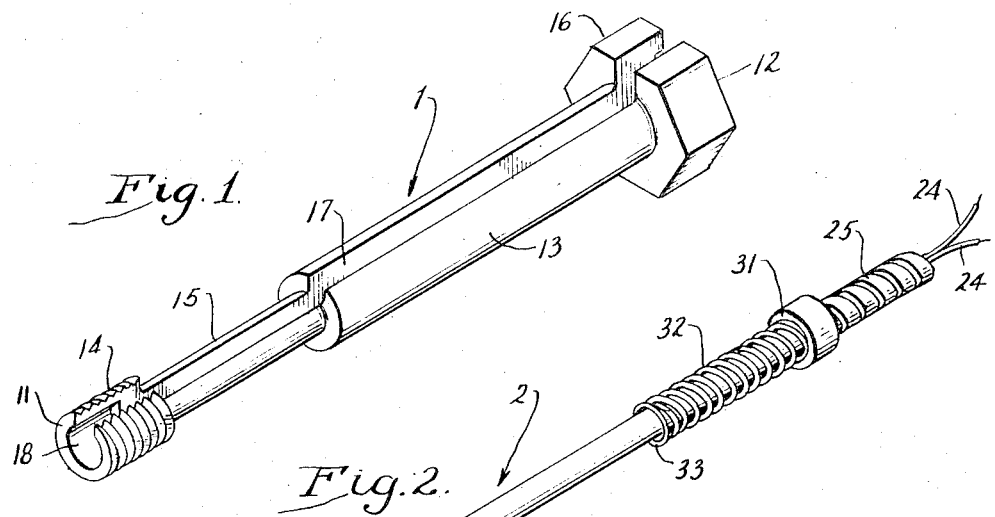
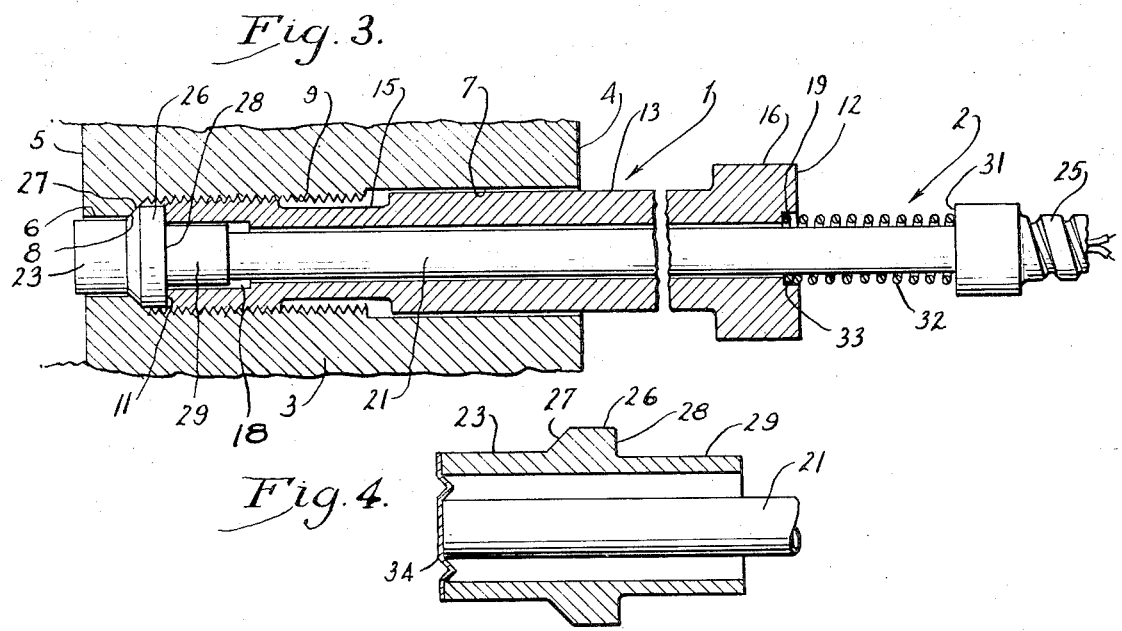

3,765,242

REUSABLE BOLT TYPE MOUNTED THERMOCOUPLE

BACKGROUND OF THE INVENTION

This invention concerns apparatus for removably mounting immersion thermocouples and the like through a wall. It is particularly concerned with reusable mountings of the bolt type for use in pressure vessels.

Bolt type mountings for immersion thermocouples are well-known in the art. They have comprised a tube, a head at the outer end of the tube for engagement by a wrench and a threaded portion for mounting the tube in the wall of a pressure vessel containing the substance of which the temperature is to be sensed, so that it resembles in appearance a machine bolt. A thermocouple junction is supported near the inner end of the tube with the leads extending through the tube for connection to an external measuring or controlling instrument. The inner end of the tube is sealed around the thermocouple in insulating fashion to prevent escape of the substnace through the tube. The thermocouple and its mounting are permanent unit. Provision is also made for a pressure seal between the assembly and the wall in which it is mounted.

When such a thermocouple is installed, the entire unit is rotated as the mounting is screwed into the wall. If the leads were connected to the external instrument before the assembly was installed, this rotation would almost certainly break the leads. If the leads were not connected, they could become tangled with other objects and possibly broken.

Upon failure of the thermocouple, the entire unit, including the mounting, is discarded and replaced by another unit, although the mounting is seldom damaged. The cost of the mounting represents a substantial portion of the cost of the assembly.

SUMMARY OF THE INVENTION

This invention provides a separable bolt type mounted sensor, providing a reusable bolt type mounting for a sensor, such as an immersion thermocouple, whereby the cost of replacing the sensor is greatly reduced. The separably mounted sensor may be easily and quickly replaced in a pressure vessel without substantial rotation of the sensor and its leads. It also provides a sensor for use in said reusable mounting. The separable combination of a reusable bolt type mounting and a sensor is interchangeable with the previously known bolt mounting type permanent units.

BRIEF DESCRIPTION OF THE DRAWING

FIG. 1 is a perspective view of a reusable bolt type mounting.

FIG. 1a is a head end view of the reusable bolt type mounting shown in FIG. 1.

FIG. 2 is a perspective view of a thermocouple assembly for use with a reusable bolt type mounting.

FIG. 3 is a sectional view of the combination of a reusable bolt type mounting and a thermocouple assembly installed in the wall of a pressure vessel.

FIG. 4 is a fragmental sectional view of a pressure sensor assembly for use with a reusable bolt type mounting.

DESCRIPTION OF THE PREFERRED EMBODIMENT

The preferred embodiment described herein comprises a reusable bolt type mounting 1, as seen in FIG. 1, and an immersible thermocouple assembly 2, as seen in FIG. 2, joined in a separable combination, as seen in FIG. 3, for installation in a wall 3 of a pressure vessel from the outside 4 to the inside 5.

In a pressure vessel adapted to receive a bolt type thermocouple, a bore 6, permitting passage of the thermocouple through the wall 3 to the inside 5 of the vessel, has an enlarged end 7 adjacent the outside 4 to receive a bolt type thermocouple. A tapered seat 8 at the inner end of the enlarged portion 7 permits a pressure tight seal to be formed with a bolt type immersion thermocouple. A thread 9 in the enlarged end permits the bolt type thermocouple to be fastened in the wall 3 and provides means for applying pressure on the tapered seat 8 to assure a good pressure seal. The separable combination of a reusable bolt type mounting 1 and thermocouple assembly 2, as described herein, may be used interchangeably with a permanent unitary bolt mounting type thermocouple in such an installation.

The mounting 1 comprises an inner end 11 for insertion into the enlarged portion 7 and an outer end 12 to remain outside the wall 3. A shank 13 receivable in the enlarged portion has a threaded portion 14 at the inner end 11 for engagement with thread 9. A relief 15 adjacent the threaded portion 14 permits use of a shorter threaded portion, thus reducing friction and cost while providing clearance for thread 9. A head 16 on shank 13 has a polygonal section for acceptance by a wrench to receive torque for screwing the mounting 1 into wall 3. A longitudinal slot 17 extends the entire length of the mounting 1 to receive the thermocouple assembly 2 and is of a depth such that the axis of shank 13 lies well within the slot. A first recess 18 in the inner end 11 and a second recess 19 in the outer end 12 are concentric with the axis of shank 13 to center the thermocouple assembly 2 in the mounting.

The immersible thermocouple assembly 2 comprises a stem 21, shown as a tube, with a thermocouple junction 22 sealed in an immersible support 23 on one end in a well known manner. Leads 24 from the thermocouple junction 22 pass through the tube 21 and a flexible cable 25 to an external connection (not shown). A collar 26, integral and concentric with support 23, has a conical end 27 adapted to be pressed into sealing contact with the tapered seat 8 and a face 28 to contact inner end 11 and to receive from mounting 1 the force required to press conical end 27 into sealing contact with tapered seat 8. A locating sleeve 29 on stem 21 is adapted to be closely received in the first recess 18. In this embodiment the sleeve 29, collar 26, and support 23 are integral with the stem 21. An abutment 31 on stem 21 is spaced from face 28 by a distance somewhat greater than the length of mounting 1. A compression spring 32, surrounding stem 21 between the collar 26 and abutment 31, is adapted to act between the abutment and outer end 12 of the mounting 1. An end 33 of spring 32 is adapted to be closely received in the second recess 19 as a movable locating means on the stem 21 to center the stem in the mounting 1.

The thermocouple assembly 2 is separably attached to the reusable mounting 1 by sliding the stem 21 laterally into slot 17 at the outer end 12 with the movable end 33, spring 32 and abutment 31 extending beyond the outer end, moving the stem through the slot so that movable end 33 mates with the second recess 19, compressing spring 32 between recess 19 and abutment 31, so that sleeve 29 clears the inner end 11, swinging the stem 21 into the slot at the inner end 11, and releasing the stem and spring so that the spring draws the sleeve into mating engagement with the first recess 18 and brings the face 28 into contact with the inner end 11 to separably hold the reusable mounting in compression on the thermocouple assembly.

If it is desired to remove the thermocouple assembly 2 from the reusable mounting 1, because of damage to the assembly or for any other reason, the spring 32 is compressed against abutment 31 to release the locating end 33 from the second recess 19, the stem 21 is swung out of slot 17 at outer end 12 and moved toward the inner end to release sleeve 29 from the first recess 18, after which the stem is removed laterally from the slot.

When the separable combination is to be installed in the wall 3 of a pressure vessel, support 23 is entered into bore 6 at the enlarged end 7 and the thermocouple assembly 2 is moved into the bore until threaded portion 14 makes contact with the thread 9. Torque is then applied to an exposed portion of the mounting 1 as by a wrench on the head 16 to engage the threaded portion with the thread and to screw the mounting into the wall until the conical end 27 is drawn into the tapered seat 8 to provide a pressure tight seal between the thermocouple assembly 2 and wall 3. While the mounting is being screwed into the wall and before the conical end contacts the tapered seat, the thermocouple assembly 2 is relatively free to rotate in the mounting 1, preventing twisting of the leads 24. It is only during the final torque application, when the seal is being formed, that the leads may be twisted. Such limited twisting is insufficient to break the leads.

FIG. 4 shows a pressure sensor in the form of a pressure sensitive diaphragm 34 sealed around its edge to support 23 and fastened at its center to stem 21. Pressure changes within the pressure vessel are converted into linear motion and transmitted to the stem 21 by the diaphragm.

It will be obvious to those skilled in the art that other modifications are possible. As an example the sleeve 29 could be separate from the collar 26. The scope of this invention is limited only the claims.

I claim:

1. A sensor assembly for use in combination with a reusable mounting, said assembly comprising a stem, a sensor at one end of said stem, a collar in fixed relation to said sensor, a face on said collar, an abutment on said stem spaced from the face, and a spring surrounding said stem between the face and the abutment and adapted to act between said abutment and the mounting to separably hold the mounting in compression between said face and the compression spring.

2. A sensor assembly according to claim 1 additionally comprising locating means on said stem adjacent the face for engagement with a mating portion of said mounting to locate the stem with respect to said mounting.

3. A sensor assembly according to claim 2 wherein said locating means comprises a sleeve.

4. A sensor assembly according to claim 3 wherein said sleeve is fixed on the stem.

5. A sensor assembly according to claim 2 wherein said locating means is movable along the stem.

6. A sensor assembly according to claim 5 wherein said locating means is movable by the spring toward said mounting.

7. A sensor assembly according to claim 1 wherein said sensor comprises a thermocouple junction.

8. A sensor assembly according to claim 1 wherein said sensor comprises a pressure sensitive diaphragm.

9. A sensor assembly according to claim 1 wherein said sensor is sealed to the collar.

10. A sensor assembly according to claim 1 additionally comprising means on the collar for providing a pressure seal around said assembly.

11. A sensor assembly according to claim 1 in combination with a reusable mounting comprising a shank having a longitudinal axis, a longitudinal slot in said shank receiving the stem, an inner end of said shank adjacent the face, and an outer end of said shank, the spring acting between said abutment and the outer end to separably retain the shank in compression on said stem between the face and said spring.

12. A combination according to claim 11 wherein said stem is substantially concentric with the shank.

13. A combination according to claim 11 additionally comprising locating means on said assembly adjacent the face and in engagement with a mating portion at the inner end of said shank to substantially fix the position of the sensor with respect to said inner end.

14. A combination according to claim 11 additionally comprising means movable on the stem and held by said spring in engagement with a mating portion at the outer end of said shank to substantially fix the position of said stem with respect to the outer end.

15. A combination according to claim 11 further comprising engaging means on said shank for removably mounting the combination.

16. A combination according to claim 15 wherein said engaging means comprises a screw threaded portion.

17. A combination according to claim 15 additionally comprising a torque receiving portion on the shank adjacent said outer end.

18. A combination according to claim 16 wherein said torque receiving portion comprises a head.

19. A reusable bolt type mounting for supporting a sensor through a wall, said mounting comprising a shank having a longitudinal axis, a longitudinal slot in said shank, an inner end of said shank for insertion in the wall, an outer ent to be maintained outside the wall, engaging means on said shank for removably fastening the mounting to the wall, and means at the inner end for locating the sensor with respect to said inner end.

20. A reusable mounting according to claim 19 additionally comprising means at the outer end for locating the sensor with respect to said outer end.

* * * * *